Nov. 25, 1958 G. A. RACE 2,861,721
GARDEN FERTILIZER SOWER
Filed Aug. 30, 1955
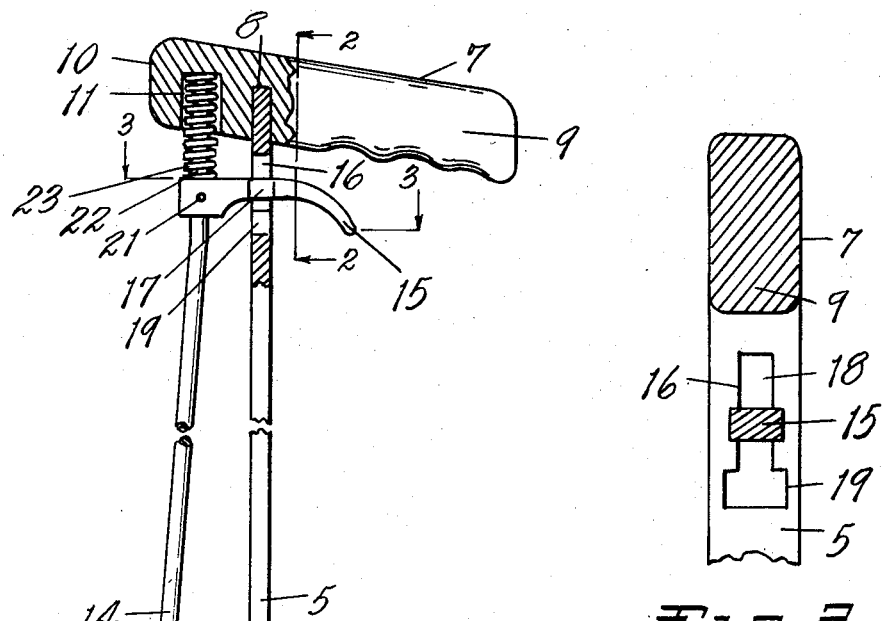
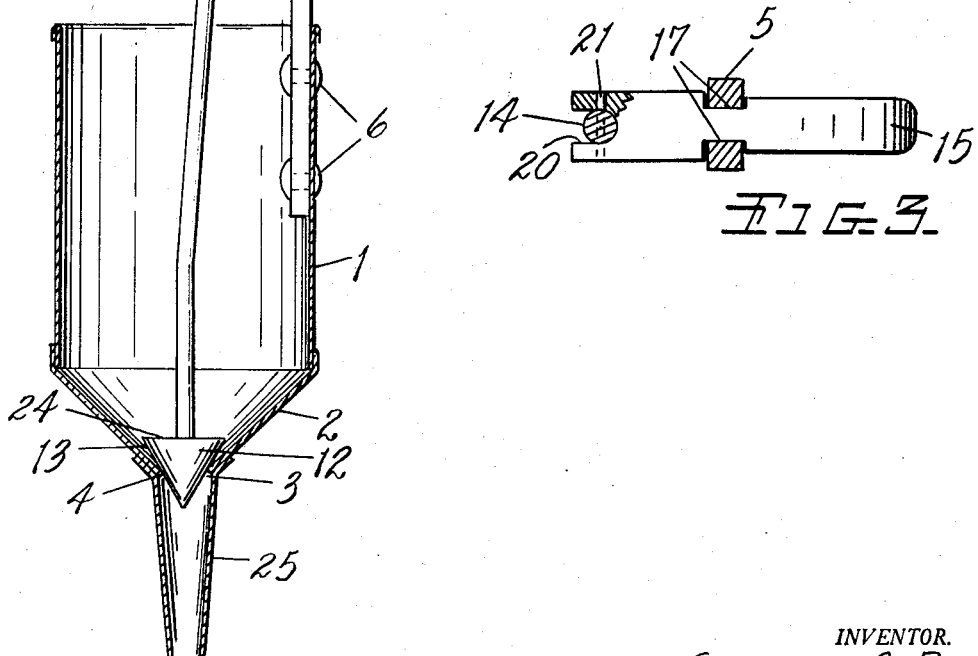
Fig. 1.  Fig. 2.  Fig. 3.
INVENTOR.
George A. Race
BY Otto A. Earl
Attorney.

ns
Patented Nov. 25, 1958

2,861,721

GARDEN FERTILIZER SOWER

George Albert Race, Fennville, Mich.

Application August 30, 1955, Serial No. 531,318

4 Claims. (Cl. 222—246)

This invention relates to a distributor for commercial fertilizers in powdered or granular form.

The main objects of this invention are:

First, to provide a fertilizer distributor for commercial fertilizers which may be conveniently and effectively used to distribute fertilizer and providing an effective control for the amount discharged.

Second, to provide a fertilizer distributor which is adapted for use in distributing fertilizer of various types.

Third, to provide a fertilizer distributor which is convenient to use and is not likely to become clogged and one in which the delivery valve is effective to cut off the flow of the material.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in side elevation and partially in vertical section of a fertilizer distributor embodying my invention.

Fig. 2 is an enlarged fragmentary view on a line corresponding to line 2—2 of Fig. 1.

Fig. 3 is an enlarged fragmentary view partially in section on a line corresponding to line 3—3 of Fig. 1.

The embodiment of my invention illustrated comprises a vertically positioned receptacle 1 of cylindrical section. The receptacle 1 has a conically tapered bottom 2 terminating in a central opening 3 constituting a discharge port. The edge surrounding the opening constitutes a narrow valve seat 4. The spout 25 extends downwardly from the discharge port of the receptacle.

The standard or shaft 5 is desirably formed of a strip of wood, its lower ends being arranged on the inner side of the receptacle and fixedly secured thereto by rivets 6 with the receptacle projecting forwardly from the standard. The handle 7 is fixedly mounted on the upper end of the standard, the handle having a slot at 8 opening to the underside thereof and in which the upper end of the standard is disposed. The handle projects rearward of the standard to provide a grip 9 and forwardly of the standard to constitute an abutment member 10 having a downwardly opening socket 11 therein.

The valve 12 is conically tapered to close the port of the receptacle by seating on the sharp edge valve seat 4. The angle of the taper of the valve is substantially less than the angle of the conically tapered bottom so that there is a clearance as shown at 13 between the valve and the adjacent wall of the bottom. This minimizes the packing of the fertilizer around the port. The valve stem 14 is secured centrally to the valve and is preferably angled toward the standard 5.

The valve stem finger piece 15 is disposed through the keyhole shaped slot 16 adjacent the upper end of the standard, the finger piece being notched at 17 to receive the edges of the narrow portion 18 of the slot. The enlarged portion 19 of the slot is such that the finger piece can be passed therethrough to bring the notches 17 thereof into register with the narrow portion of the slot in which the finger piece is vertically reciprocable.

The finger piece has an end opening 20 therein receiving the stem to which the finger piece is secured as by the pin 21. The upper end of the valve stem 22 projects into the lower end of the coil spring 23 which is seated in the socket 11. The projecting end 22 of the valve stem serves to retain the spring in the socket and in thrust engagement with the finger piece on the stem.

The top 24 of the valve is preferably flattened as illustrated so that when the valve is reciprocated it serves as an agitator for the fertilizer further minimizing its likelihood of clogging the discharge port. Owing to the taper of the valve and the narrow or sharp edged valve seat the valve seats under the thrust of its biasing spring 23 to effectively cut off the flow of fertilizer.

The applicant's distributor may be very effectively used with a wide range of commercial fertilizer material some of which is distinctly granular in character and flows quite readily while other types are more or less powder-like or includes considerable powdery content which is less flowable and tends to cling to contacted parts.

The spout 25 is of such capacity as to permit free flow of the material passing the valve. The amount of fertilizer discharged may be quite accurately controlled and also the positioning of the fertilizer relative to the plant or the like, for example, the spout of the distributor may be directed to discharge the desired distance from a plant and the distributor may be swung in a circle around the plant or it may be manipulated to broadcast the fertilizer.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention what I claim as new and desire to secure by Letters Patent is:

1. A fertilizer distributor comprising an upright cylindrical receptacle provided with a conically tapered bottom having a central opening constituting a discharge port, the edge surrounding the opening constituting a narrow valve seat, a standard secured to the receptacle with the receptacle projecting forwardly therefrom, a handle fixedly mounted on the upper end of said standard and including a grip projecting rearwardly from the standard and an abutment portion projecting forwardly from the standard and having a downwardly facing socket therein, a conically tapered valve seating on said valve seat, the angle of taper of the valve being substantially less than that of the bottom of the receptacle so that when seated the valve does not contact the receptacle bottom other than said valve seat thereof, said valve having a flat top and constituting a material agitator as the valve is reciprocated, a valve stem disposed in front of said standard and connected to the valve centrally thereof, a finger piece disposed below said handle member and connected to said valve stem adjacent its upper end, said standard having a keyhole slot with which said finger piece is reciprocatingly engaged, the finger piece being notched to coact with the edges of said slot and being insertable through the larger portion of the slot, and a spring seated in said socket in said handle member in thrust engagement with said finger piece, said stem projecting above said finger piece in retaining engagement with said spring.

2. A fertilizer distributor comprising an upright cylindrical receptacle provided with a conically tapered bottom having a central opening constituting a discharge port and an elongated discharge spout into which said discharge port discharges, the edge surrounding the opening in said bottom constituting a narrow valve seat, a standard secured to the receptacle, a handle fixedly mounted on the upper end of said standard and including a grip projecting rearwardly from the standard and an abutment portion projecting forwardly from the standard and having a downwardly facing socket therein, a conically tapered valve seating on said valve seat, the angle of taper of the valve being substantially less than that of the bottom of the receptacle so that when seated the valve does not contact the receptacle bottom other than said valve seat thereof the tip of the valve when closed being within said spout, said valve having a flat top and constituting a material agitator as the valve is reciprocated, a valve stem connected to the valve centrally thereof, said receptacle being provided with a discharge spout extending substantially below said valve seat and the lower end of said valve, a finger piece for said stem reciprocatingly engaged with said standard, and a spring seated in said socket in said handle member in thrust engagement with said finger piece, said stem projecting above said finger piece in retaining engagement with said spring.

3. A fertilizer distributor comprising a receptacle provided with a conically tapered bottom having a central opening constituting a discharge port, the edge surrounding the opening constituting a valve seat, a standard secured to the receptacle, a handle member on said standard having a downwardly facing socket therein, a conically tapered valve seating on said valve seat, the angle of the taper of the valve being substantially less than that of the bottom of the receptacle so that when seated the valve does not contact the receptacle bottom other than said valve seat thereof, said valve having a portion above its seat engaging zone constituting a material agitator as the valve is reciprocated, a stem for said valve provided with a finger piece disposed below said handle member, said standard having a keyhole slot with which said finger piece is reciprocatingly engaged, the finger piece being notched to coact with the edges of said slot and being insertable through the larger portion of the slot, and a spring seated in said socket in said handle member in thrust engagement with said finger piece, said stem projecting above said finger piece in retaining engagement with said spring.

4. A fertilizer distributor comprising a receptacle provided with a conically tapered bottom having a central opening constituting a discharge port, a standard secured to the receptacle, a handle member on said standard having a downwardly facing socket therein, a valve for said discharge port, a stem for said valve provided with a finger piece disposed below said handle member, said standard having a keyhole slot with which said finger piece is reciprocatingly engaged, the finger piece being notched to coact with the edges of said slot and being insertable through the larger portion of the slot, and a spring seated in said socket in said handle member in thrust engagement with said finger piece, said stem projecting above said finger piece in retaining engagement with said spring.

References Cited in the file of this patent

UNITED STATES PATENTS

| | | |
|---|---|---|
| 945,362 | Ashe | Jan. 4, 1910 |
| 1,833,907 | Law | Dec. 1, 1931 |
| 1,880,625 | Wilmeth | Oct. 4, 1932 |
| 1,934,197 | Mackay et al. | Nov. 7, 1933 |
| 2,554,293 | Brown | May 22, 1951 |
| 2,656,071 | Smith | Oct. 20, 1953 |